(12) United States Patent
Johnson et al.

(10) Patent No.: US 7,381,177 B2
(45) Date of Patent: Jun. 3, 2008

(54) FLOWABLE FILL AND FLOWABLE FILL METHOD FOR DISPOSAL OF RECOVERED WASTE

(75) Inventors: Casey Glenn Johnson, Idalou, TX (US); Kyle Martin Zahn, Lubbock, TX (US)

(73) Assignee: C & D Waste, Ltd., Lubbock, TX (US)

( * ) Notice: Subject to any disclaimer, the term of this patent is extended or adjusted under 35 U.S.C. 154(b) by 0 days.

(21) Appl. No.: 11/233,123

(22) Filed: Sep. 22, 2005

(65) Prior Publication Data

US 2007/0066861 A1    Mar. 22, 2007

(51) Int. Cl.
*B09C 1/00*    (2006.01)
(52) U.S. Cl. ..................... 588/256
(58) Field of Classification Search ............... 588/256, 588/257
See application file for complete search history.

(56) References Cited

U.S. PATENT DOCUMENTS

| | | | |
|---|---|---|---|
| 4,028,130 A | 6/1977 | Webster et al. | |
| 4,050,950 A | 9/1977 | Brewer | |
| 4,374,672 A | 2/1983 | Funston | |
| 4,432,666 A * | 2/1984 | Frey et al. | 588/257 |
| 5,106,422 A | 4/1992 | Bennett | |
| 5,161,915 A | 11/1992 | Hansen | |
| 5,352,290 A | 10/1994 | Takeshita | |
| 5,405,441 A * | 4/1995 | Riddle | 106/705 |
| 5,525,009 A | 6/1996 | Hansen | |
| 5,565,028 A * | 10/1996 | Roy et al. | 106/705 |
| 5,649,894 A * | 7/1997 | White et al. | 588/256 |
| 5,852,077 A | 12/1998 | Zawada | |
| 2001/0039902 A1 | 11/2001 | Hedley | |
| 2004/0040245 A1 * | 3/2004 | Sinclair et al. | 52/605 |

FOREIGN PATENT DOCUMENTS

| | | | |
|---|---|---|---|
| CN | 1541971 A | * | 11/2004 |
| JP | 09225285 A | * | 9/1997 |
| WO | WO 9723427 A1 | * | 7/1997 |

OTHER PUBLICATIONS

Solo-Gabrielle, et al. "Disposal practices and management alternatives for CCAtreated wood waste ",Oct. 1999 Waste Management and Research vol. 17 p. 37-3898.*

* cited by examiner

*Primary Examiner*—John Kreck
(74) *Attorney, Agent, or Firm*—Robert W. Brown

(57) ABSTRACT

An improved flowable fill material and method for producing same that provides a medium for disposal of waste wood or other reclaimed debris, including wood treated with anti-microbial and/or anti-fungal materials including those containing copper, chromium and arsenic bearing compounds. The flowable fill material, comprised entirely of recovered and/or recycled materials, provides a medium for the safe disposal of chipped wood or other recovered waste by effectively encapsulating wood chips and substantially retarding further decomposition. Encapsulation of treated wood substantially reduces leaching of arsenic and/or other toxic substances contained therein. The systematic mixing of water, Class C fly ash, and wood chips in specific proportions carries out the present invention.

32 Claims, 3 Drawing Sheets

FLOWABLE FILL AND FLOWABLE FILL METHOD FOR DISPOSAL OF RECOVERED WASTE

TECHNICAL FIELD OF THE INVENTION

The present disclosure relates to the field of waste recovery. In particular, the production of a flowable fill material that incorporates waste materials. More particularly, the disclosure relates to rapid-setting and self-hardening flowable fill material that utilizes both waste wood chips and coal combustion by-products and provides a disposal medium for waste treated wood.

BACKGROUND OF THE INVENTION

The present disclosure relates to the field of waste recovery. In particular, the production of a flowable fill material that incorporates waste materials. More particularly, the disclosure relates to rapid-setting and self-hardening flowable fill material that utilizes both waste wood chips and coal combustion by-products and provides a disposal medium for waste treated wood.

As world populations continue to rise, the demand for food, fuel and other needed resources rises commensurately. Ever-increasing consumption and corresponding production continues to stress global ecosystems at unprecedented levels. These facts act to fortify the compelling notion of recycling and waste reduction. The disclosure contained herein is comprised of recycled and/or recovered materials.

Scrap Wood represents a significant portion of many waste streams. Studies have shown that wood comprises 20-30% of many waste streams entering municipal solid waste landfills and can exceed 30% at construction and demolition debris landfills. In 1998, the EPA estimated that 136 million tons of building-related debris was generated, with wood representing the largest single component. This fact becomes much more concerning when it is considered that a significant portion of the wood currently in use is treated, thus a significant portion of the wood waste stream is comprised of treated wood.

Wood is commonly treated with preservatives to inhibit fungal and microbial decay. Common preservatives include creosote and pentachlorophenol. But the predominant preservative over the past 10-20 years has been chromated copper arsenate (CCA) that introduces copper chromium and arsenic to the wood. Chromium and arsenic and toxic to mammals and copper is toxic to most aquatic life.

During the CCA treatment process, wood is first dried in a kiln. The dried wood is then placed in a pressure vessel where a vacuum is pulled and effectively applied to the wood's pore space. A CCA solution is then introduced into the vessel and pressurized causing the solution to enter the pore spaces. After the pressure is removed, the wood is the removed from the vessel and allowed to dry over a drip pad.

There are three types of CCA-treated wood: Type A, Type B, and Type C, with Type C being the most common. Type C CCA is composed (by weight) of 34.0% $As_2O_5$, 47.5% $CrO_3$, and 18.5% CuO.

The American Wood Preservers Institute (AWPI) estimates that treating wood with CCA increases the usable life of wood by 7 to 12 times. The actual CCA content in treated wood is significant. It is estimated that the amount of arsenic associated with CCA-treated wood currently in service in the state of Florida alone is 26,800 tons. Though the desirable characteristics of treated wood are obvious, it has been observed that chemically treating lumber takes a perfectly useable, recyclable material from a renewable resource and renders it toxic.

CCA became widely used in the late 1970s and now represents approximately 80% of the treated wood market in the U.S. It is estimated that 6.5 billion board feet are treated each year in the U.S. Treated wood is particularly well suited for use in residential and small commercial decks, and estimates are that CCA treated wood has been used in over 80% of residential decks since the early 1970s. As the treated wood that is now in service expires in the coming years, the amount of CCA-treated wood arriving at landfills is expected to peak sometime between the years 2020 and 2030.

It is difficult to visually discern between treated and untreated wood, thus most states currently CCA-treated wood in the same manner as other discarded wood and wood products. Therefore, most treated wood in the waste stream ends up at unlined construction and demolition waste landfills. A far lesser amount is disposed in municipal solid waste landfills or incinerated at waste to energy facilities. Since the toxic metals in CCA easily survive the incineration process, burning treated wood is discouraged. Further, incinerating can convert trivalent chromium into highly toxic hexavalent chromium.

As previously discussed, the metals in CCA easily survive incineration and escape with flue gas. Further numerous studies have shown that CCA, particularly the arsenic component easily leaches from treated wood, thus, incineration, landfill disposal and processing into mulch are not suitable waste outlets for CCA-treated wood. Though little data is currently available, there is growing concern about the impact that CCA-treated wood in landfills may ultimately have on groundwater. Given these problems associated with CCA-treated wood and the existing and ever-growing problems associated with disposal or reuse, there exists a substantial need for an economical, safe, and environmentally responsible means of disposing of expired CCA-treated wood.

Concrete is one of the oldest and most important composite materials known to man and generally consists of a course aggregate (rock and/or gravel), sand, and hydrated Portland cement. The finished properties of concrete generally depend on several factors: ratio of cement, sand and aggregate; ratio of water to cement; nature of the course aggregate; mixing and laying methods; and curing time.

Portland cement, named after its likeness to the indigenous limestone of Portland Bill, England, is a mixture of primarily four minerals: tricalcium silicate ($3CaO.SiO_2$); dicalcium silicate ($2CaO.SiO_2$); tricalcium aluminate ($3CaO.Al_2O$); and tetracalcium aluminoferrite ($4CaO.Al_2O_3.Fe_2O_3$). Typical composition, expressd in terms of oxides, is 65% Ca, 20% $SiO_2$, 5% $Al_2O_3$, with the balance comprised of $Fe_2O_3$ and other admixtures. Portland cement is generally obtained by mixing materials which supply lime (usually limestone or chalk) with materials which supply silica and alumina (usually clay) and firing these mixtures to ~1200 K for some period of time. Hydration of the oxides in Portland cement is a reaction that proceed for a very long time, as evidenced by concretes continued measurable hardening for years.

Fly ash is the inorganic non-combustible portion of coal that remains after pulverized coal is burned, and is generated in huge quantities by coal-fired electric generating facilities throughout the U.S. Fly ash is comprised of glassy, spherical shaped particles that are typically recovered from flue gas by means of electrostatic precipitators. There are two common Classes of fly ash: Class C and Class F. Class C is produced from burning lignite and sub-bituminous coal, and Class F is produced from burning anthracite and bituminous coal. The comparative typical mineral content of Class C fly ash, Class F fly ash, and Portland cement is shown below in Table 1.

TABLE I

| Chemical Compound | Class C Fly Ash | Class F Fly Ash | Portland Cement |
|---|---|---|---|
| SiO | 39.90 | 54.90 | 22.60 |
| $Al_2O_3$ | 16.70 | 25.80 | 4.30 |
| $Fe_2O_3$ | 5.80 | 6.90 | 2.40 |
| CaO | 24.30 | 8.70 | 64.40 |
| MgO | 4.60 | 1.80 | 2.10 |
| $SO_3$ | 3.30 | 0.60 | 2.30 |
| $Na_2O$ & $K_2O$ | 1.30 | 0.60 | 0.60 |

An important characteristic of Class C fly ash is self-cementing or self-hardening when mixed with water, characteristics enabled by a relatively high CaO (lime) content. As can be seen in Table 1, the CaO content of typical Class C fly ash is almost three times that of Class F.

Fly ash has found particular use as an additive in concrete and pavement materials. When added to Portland cement, fly ash effectively reduces the amount of lime needed and aids in converting free lime to calcium silicate hydrate, a substance similar to the dicalcium and tricalcium silicates—the strongest paste portion of concrete—formed during curing. Concrete enhanced with Class C fly ash will typically strengthen faster than plain concrete due to the additional lime content. Concrete enhanced with Class F fly ash will typically strengthen slower than plain concrete until about 7 days, then it will typically strengthen at a faster rate.

The environmental benefits of using fly ash are numerous. Materials such as Portland cement, lime and crushed stone require energy to produce. Utilizing one ton of fly ash to replace an equivalent ton of any of these materials conserves the energy equivalent of one barrel of crude oil, as well as reducing $CO_2$ emissions by approximately one ton.

A Flowable fill prepared from fly ash, also commonly known as controlled density fill, has many highly desirable properties. It is a fill material that flows easily, is self-leveling, self-compacting, and non-settling after hardening in place. A fly ash-based flowable fill will easily encapsulate whatever has been placed in a trench or void and will provide protection after hardening. A fly ash-based flowable fill can typically be placed in any weather at any time and will displace standing water. Fly ash-based flowable fill can typically be prepared using conventional concrete mixing equipment and pumped using conventional concrete pumping equipment.

The disclosure contained herein takes advantage of the self-cementing properties of Class C fly ash and enhances these properties by the addition of brine to produce a flowable fill material which not only provides a medium for a preferred disposal means for treated wood, but also provides a highly effective fill material useful for a plurality of backfilling applications.

SUMMARY OF THE INVENTION

The present invention includes a flowable fill material and a method for producing same. The flowable fill material, comprised entirely of recovered and/or recycled materials, provides a medium for the safe disposal of waste wood and more importantly waste CCA-treated wood after reduction to chip form, by effectively encapsulating the wood chips and substantially retarding further decomposition. More importantly, encapsulation of treated wood substantially reduces leaching of arsenic and/or other toxic substances contained therein. The present invention is produced by the systematic mixing of water, brine, Class C fly ash, and wood chips in specific proportions.

BRIEF DESCRIPTION OF THE DRAWINGS

The figures presented herein when taken in conjunction with the written disclosure form a complete description of the invention.

DETAILED DESCRIPTION OF THE PREFERRED EMBODIMENTS

The present invention involves the production of a flowable fill material, produced from readily available recovered and/or recycled materials, that doubles as a disposal medium for waste wood. More importantly, the present invention provides a disposal medium for treated wood, including CCA-treated wood. The preferred embodiment is comprised generally of Class C fly ash, salt solution (brine), water, and chipped waste wood.

ASTM Designation C618-03 describes fly ash as the finely divided residue that results from the combustion of ground or powdered coal and that is transported by flue gas. More specifically, C618-03 further describes Class C fly ash as fly ash normally produced from burning lignite or sub-bituminous coal, and in addition to having pozzolanic properties, also has some cementitious properties. The chemical and physical requirements for Class C fly ash, as defined by ASTM C 618-03 are included below in Table II and Table III respectively.

TABLE II

| ASTM C 618-03 Chemical Requirements Class C Fly Ash | |
|---|---|
| $SiO_2$ plus $Al_2O_3$ plus $Al_2O_3$, min. % | 50.0 |
| $SO_3$, max. % | 5.0 |
| Moisture content, max. % | 3.0 |
| Loss on ignition, max. % | 6.0 |

TABLE III

| ASTM C 618-03 Physical Requirements Class C Fly Ash | |
|---|---|
| Fineness: amount retained when wet-sieved on No. 325 sieve, max. % | 34 |
| Strength activity index: | |
| 7 days, min. % of control | 75 |
| 28 days, min. % of control | 75 |
| Water requirement, max. % of control | 105 |
| Autoclave expansion or contraction, max. % | 0.8 |
| Density, variation from average, max. % | 5 |
| Percent retained on No. 325 sieve, max. % variation | 5 |

The present invention is generally prepared by mixing, by volume, approximately 1 part water, approximately 3 parts Class C fly ash, and approximately 3 parts chipped wood. More specifically, the mixture can contain volume ratios of 12-16% water, 41-45% Class C fly ash, and 41-45% chipped wood, with the fly ash being measured in a loose, dry, non-compacted form.

The preferred embodiment is prepared by mixing, by volume, approximately 10 parts water, approximately 1 part brine solution, approximately 30 parts Class C fly ash, and approximately 30 parts chipped wood. More specifically, the mixture can contain volume ratios of 12-16% water, 1-2% brine solution, 40-44% Class C fly ash, and 40-44% chipped wood. Class C fly ash being measured in a loose, dry, non-compacted form.

Figure 1:
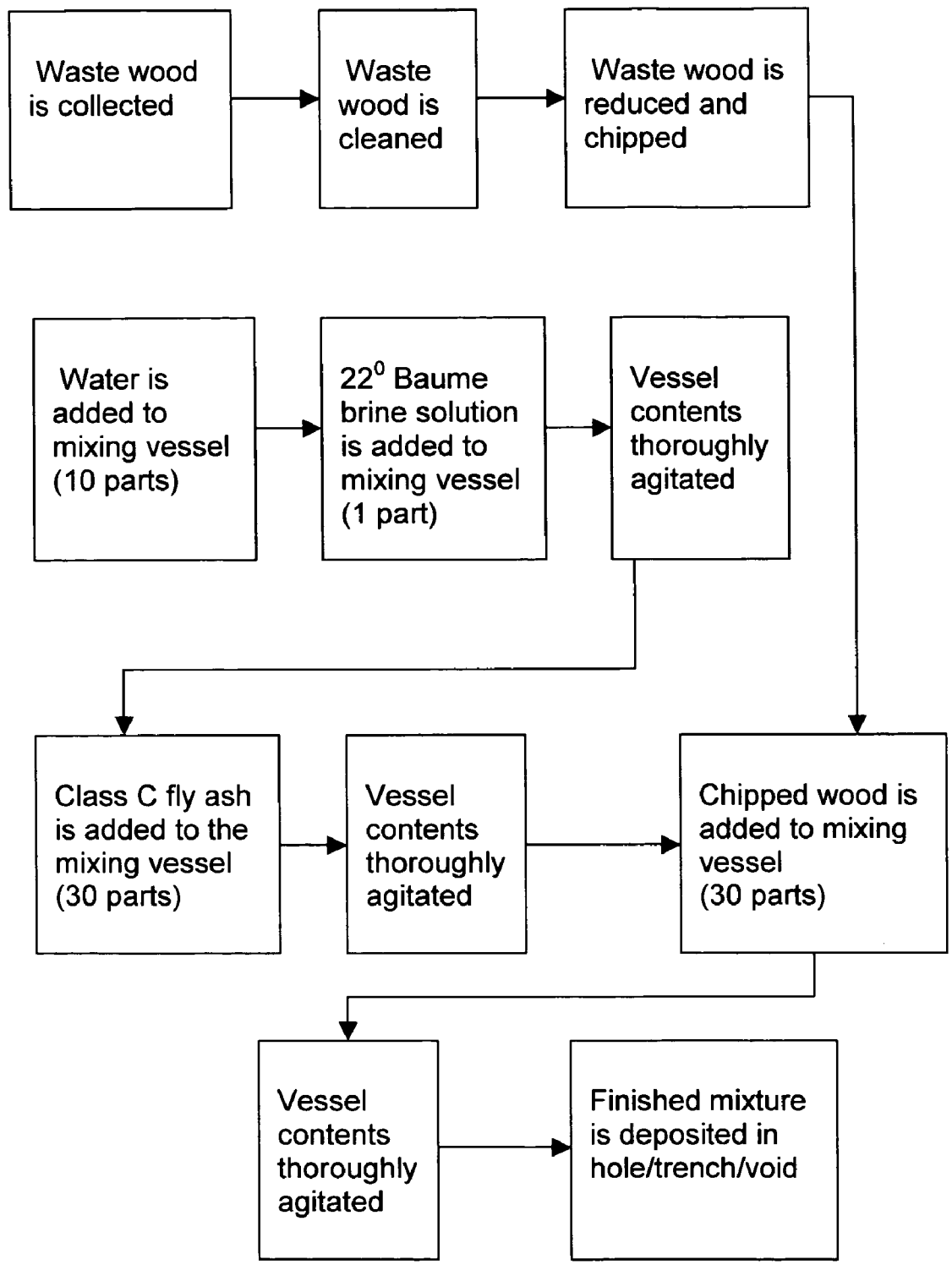
FIG. 1 provides a graphical illustration of the steps followed to carry out the preferred embodiment.

FIG. 1 provides a flow chart illustrating the steps necessary for carrying out the preferred embodiment of the invention disclosed herein. With continued reference to FIG. 1, a mixing vessel is filled with 10 volume parts of water. This water should be clean and generally free from contamination, but does not need to be potable. 1 volume part of 22° Baume $MgCl_2$ brine solution is then added to the mixing vessel. The contents are agitated such that the brine is equally dispersed. 1 volume part of $MgCl_2$ brine solution in the range of 18°-26° Baume may be successfully used, but a 22° concentration is preferred.

30 volume parts of Class C fly ash is then added to the mixing vessel and thoroughly agitated. Importantly, the fly ash is measured in dry, powdered, non-compacted form. It is recommended that the fly ash be added slowly, in individual or small volume parts, and that the mixture be continuously agitated as the fly ash is introduced. Naturally occurring brine solutions containing $MgCl_2$ and $MgSO_4$ are available in some areas and may be used successfully Importantly, in the preferred embodiment, the brine solution should be prepared by mixing water and $MgCl_2$ and adjusting the concentration to 22° Baume. Degrees on the Baume scale correlate to the specific gravity of the solution. For liquids heavier than water, 0° Baume corresponds to a specific gravity of 1.000 (water at 4° C.) and 66° Baume corresponds to a specific gravity of 1.835. Degrees Baume may be calculated from the following formula:

$$d = m - m/s$$

where m=145, s is specific gravity, and d is ° Baume.

It has been found that the addition of brine affects setting time of the fill material. Brine solutions containing NaCl, $CaCl_2$, and $MgCl_2$ can be used, but $MgCl_2$ is preferred. There is an inverse general relationship between brine content and setting time. Thus increasing brine content will decrease setting time. By contrast, conventional inhibitors, such as sodium borate or those containing sucrose or other sugars may be used to retard setting time.

An exothermic reaction caused by the addition of brine has been observed, and increasing brine concentration will increase the temperature of the water-brine-fly ash mixture. The reaction is likely the production of magnesium hydroxide and calcium chloride from magnesium chloride and hydrated calcium oxide. It follows that in an environment wherein ambient conditions are controlled, temperature of the mixture could be used to control continuous inputs of water, brine and fly ash. It also follows that in a controlled environment, mixture temperature might be used to predict setting time.

With reference to FIG. 1, wood chips are then introduced into the mixing vessel containing a thoroughly blended mixture of water, brine and Class C fly ash. Wood chips are added at a rate of 30 volume parts. The size of the wood chips can vary greatly, thus volume parts may be difficult to measure. The 30-volume part ratio recommended in the preferred embodiment is measured using an average chip size of approximately 6 in$^3$. It is further recommended that the average size of the finished chips not exceed 27 in$^3$. However, wood chip size limitations are largely dependent upon the specific application. In applications wherein the material will be used to fill large holes, trenches or the like, larger wood chips may be used successfully. Filling smaller holes, trenches or the like may require the use of smaller chips.

After adding the prepared wood chips to the water-brine-fly ash mixture, the resulting mixture should be mixed/agitated for a length of time sufficient to fully incorporate the wood chips into the mixture. Adequate mixing is critical in order to fully coat the outer surface of the wood chips. It is realized that upon pouring the finished fill material into a hole, trench or the like, some of the wood chips will locate to the fill/trench interface. These chips will likely be subjected to contact with potentially fluctuating levels of water, air, microbes and other factors that promote decay and degradation. Thorough mixing of the finished mixture prior to placement in a hole, trench or the like, will better insure that chips which locate at said interface will be sufficiently coated with fly ash mixture to inhibit said decay and degradation.

Figure 4:
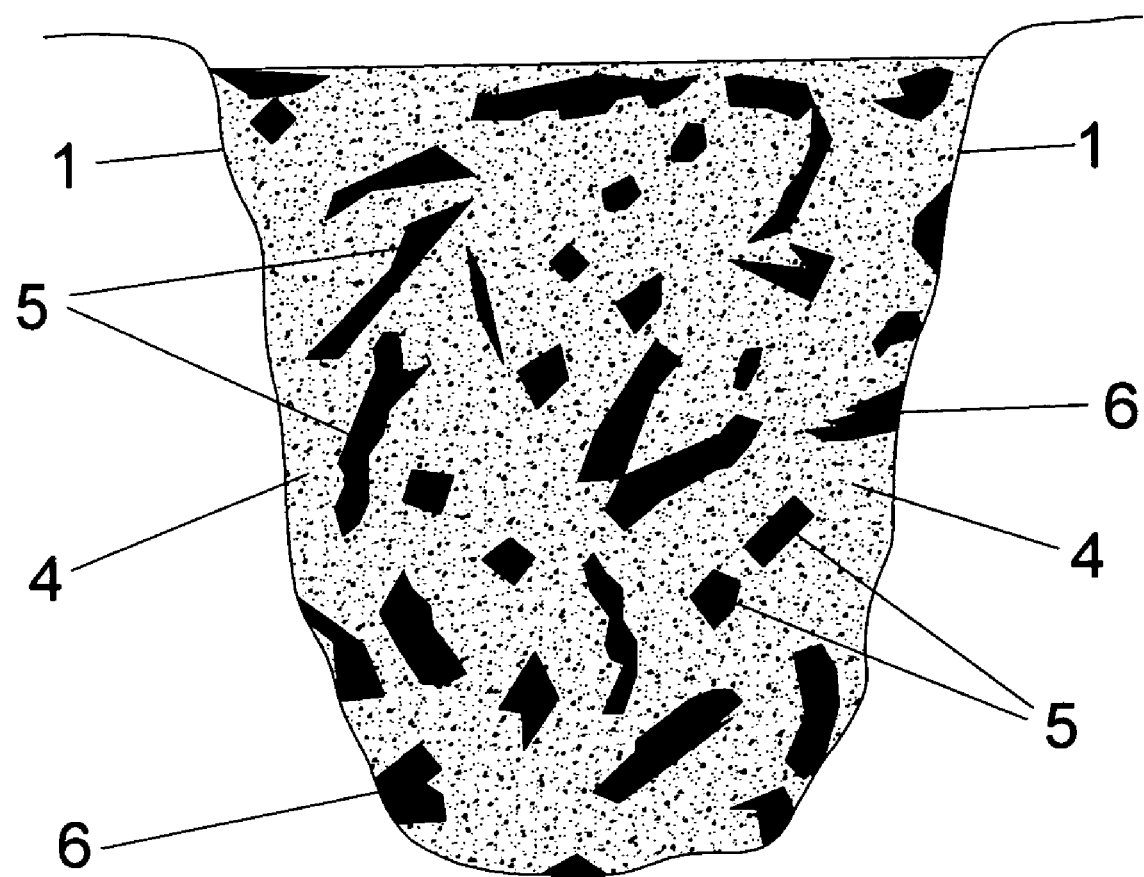
FIG. 4 provides a cutaway view of a trench filled with the preferred embodiment of subject flowable fill material.

FIG. 4 provides illustration of a trench 1 filled with the flowable fill material 4 disclosed herein containing wood chips 5. As discussed above, woods chips 6 located along the fill/trench boundary I will contact the trench wall, thus be subjected to the conditions present in the surrounding soil and at the fill/trench interface. Wood chips 5 located within the fill material will be effectively encapsulated by the fly ash medium and isolated from surrounding conditions.

These steps may be carried out in either a batch or continuous manner. The specific process used, whether batch or continuous, will largely be determined by equipment design, availability and the like. The steps disclosed herein are generally very simple and can be carried out in a plurality of ways and by means of a plurality of equipment configurations and/or designs.

A key characteristic of the embodiments disclosed herein is that the fill material effectively encapsulates the wood or other waste introduced therein. Said encapsulation effectively retards degradation and inhibits introduction of constituent components into the surrounding environment.

Fill material made by means of the steps detailed above was evaluated to assess the durability to moisture attack by subjecting a sample (16"×12"×5") to 20 cycles of temperature, humidity, and water immersion. Each cycle consisting of the following:

1) 4 hours at 100° F. and 100% Relative Humidity
2) 2 hours at 0° F. and 10% Relative Humidity
3) 2 hours of complete water immersion at 75° F.
4) 16 hours at 120° F. and 0% Relative Humidity Examination of the sample showed no deleterious effects on the encapsulated wood or fill material. Further, weighing of the sample indicated no measurable water uptake due to immersion. This data supports the notion that reactions observed between fly ash and water and between fly ash, water and brine, are non-reversible. Further, this data indicates that there are no hydrolysable components in the finished and cured flowable fill material disclosed herein.

As discussed above, waste wood is cleaned and reduced to chip or chip-like form prior to being added to the water-brine-fly ash mixture. Any suitable cleaning and chipping means may be utilized. In the preferred embodiment, metals are first separated from waste wood by means of a conveyer system equipped with a magnetic head pulley. Non-iron bearing heavy materials are then separated from waste wood by means of a floatation tank wherein waste wood is allowed to float while heavy materials such as rocks, soil, and other metals sink to the bottom to be collected. The cleaned wood is removed from the flotation tank and introduced into an impact crusher that reduces the larger pieces. Effluent form the impact crusher is then fed into a chipper/grinder that reduces the wood to components that are approximately 6 in$^3$ or smaller. Cleaned and chipped wood may contain up to 5%, by weight, of foreign matter, typically dirt or soil.

Equipment and methods used to clean and reduce the wood may vary and fall outside the scope of this disclosure. For example, it is discussed supra that waste wood can be cleaned by means of a magnetic conveyer system followed by a flotation apparatus. Alternatively, the wood can be cleaned by means of a series of vibrating screens. It is also disclosed herein that waste wood can be initially reduced in an impact crusher, such as that used to crush stone. Alternatively, a large tree/limb chipper or modified waste tire grinder can be used. The specific equipment used to carry out the steps disclosed herein fall outside the scope of this disclosure.

In the preferred embodiment, up to 1 volume part of foreign materials may be tolerated. These materials may include, but are not limited to, metals, glasses, plastics, cellulosic materials other than wood, asphalt and/or composite shingles, or other waste materials. Preferably, said foreign materials are reduced to pieces substantially smaller than the wood chips used therewith.

Figure 2:
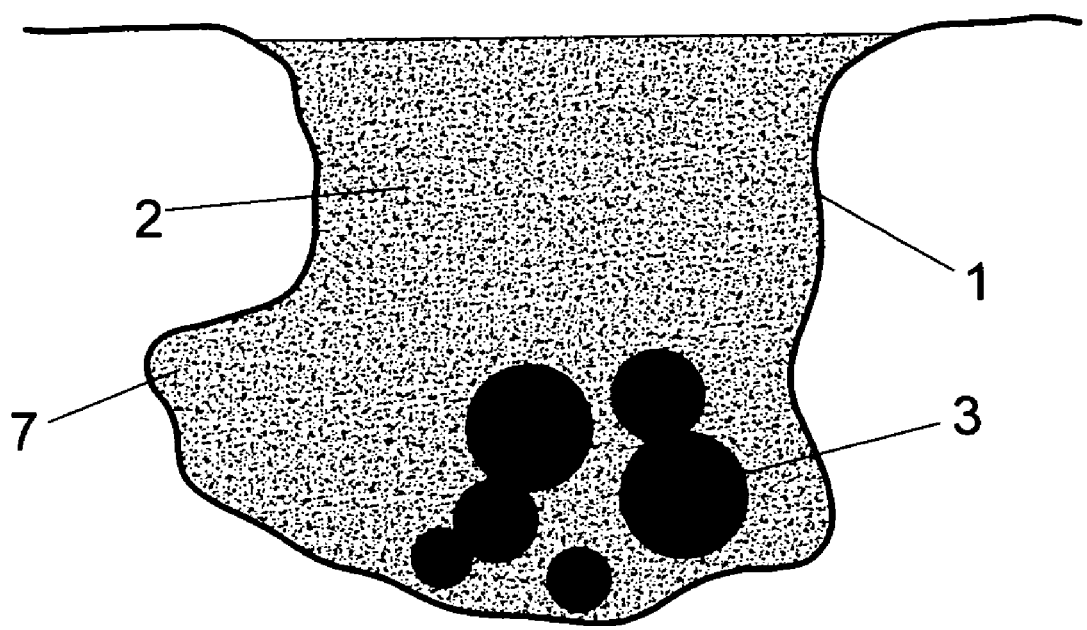
FIG. 2 provides a cutaway view of an irregular trench filled with a flowable fill material.
Figure 3:
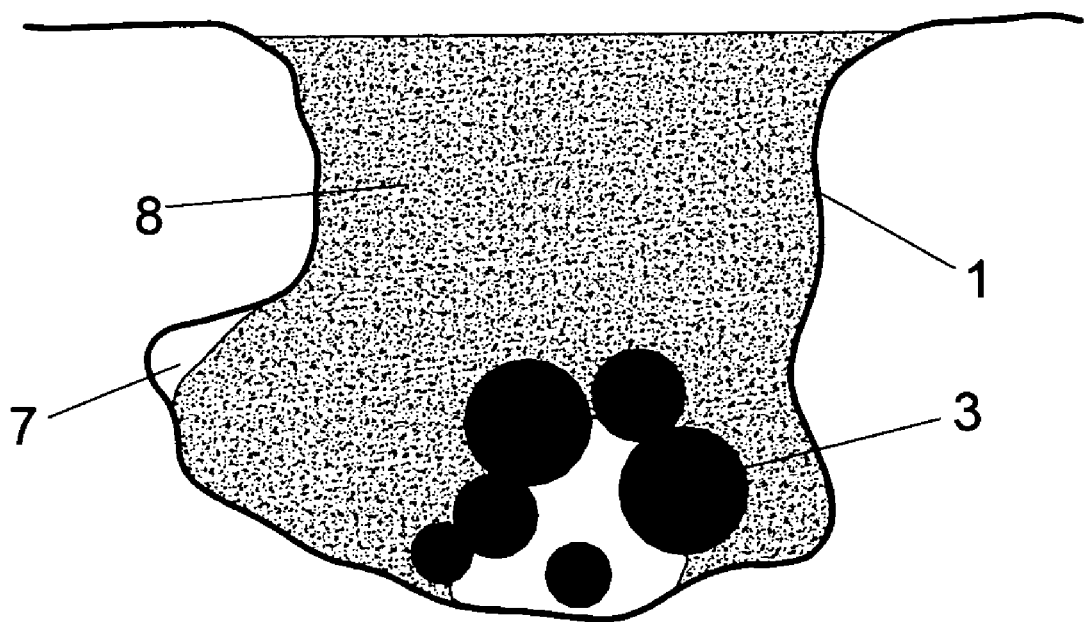
FIG. 3 provides a cutaway view of an irregular trench filled with a non-compacted non-flowable fill material.

The flowable fill material of the preferred embodiment will encapsulate all items, such as piping, cables, or wiring that have been laid or installed in the trench or hole into which it is introduced. It is self-setting and self-leveling and no mechanical force is required to place or compact the fill material. For reference, FIG. 2 illustrates an advantage of using a flowable fill material in lieu of soil of other fill that must be positioned and compacted after placement. FIG. 2 shows a cross sectional view of an irregular trench 1 that widens at the bottom 7, and contains piping, cables, or wiring 3. As illustrated, flowable fill material fills voids, effectively encapsulates whatever has been installed in the trench, and after setting, protects it against damage. Since flowable fill flows into place, no mechanical force is needed to place or compact the fill. By contrast, FIG. 3 shows the same trench 1 filled with a non-compacted, non-flowable fill 8. As can be seen, neither the widened portion of the trench 7 nor the region bound by the content 3 is filled.

While the subject invention has been set forth in this disclosure with respect to the preferred embodiment, and in some cases optional embodiments have been set forth, it will be appreciated by those skilled in the art that there are many ways to implement the invention without departing from the scope and spirit of the invention as disclosed herein.

The embodiments described supra are exemplary. Many details are found in the art, therefore, many such details are neither shown nor described. Even though numerous characteristics and advantages of the present invention have been described in the accompanying text, the description is illustrative only, and changes may be made in the detail, especially in matters of size and/or order within the principles of the invention to the full extent indicated by the broadest possible meaning of the terms of the attached claims. The limits of the invention and bounds of the patent protection are measured by and defined in the following claims.

The restrictive description and drawings of the specific examples herein do not point out what an infringement of this patent would be, but are to provide at least one explanation of how to make and use the embodiments disclosed herein. The limits of the invention and the bounds of the patent protection are measured by and defined in the following claims.

What is claimed is:

1. A method for filling an earthen void with a self-setting, self-hardening flowable fill material that does not contain Portland cement comprising the steps of:
   (a) providing a base of fresh water;
   (b) adding Class C fly ash to said fresh water base and mixing, said fly ash added in a respective volume ratio to said water in the range of 2:1 to 4:1 as measured in a dry, non-compacted form;
   (c) adding special waste to the water-fly ash mixture and mixing, said special waste added in a respective volume ratio to said water in the range of 2:1 to 4:1;
   (d) pouring or otherwise placing the mixture from step (c) into an earthen hole, earthen trench or other fillable void in the ground.

2. The method of claim 1 including the step of adding a brine solution to said fresh water base in a respective volume ratio in the range of 1:7 to 1:13, and mixing.

3. The method of claim 2 wherein said brine solution contains $MgCl_2$.

4. The method of claim 3 wherein said brine is a naturally occurring ground-source brine solution.

5. The method of claim 2 wherein the specific gravity of said brine solution is adjusted to within a range of 18° to 26° Baume by adding metal salts or diluting with fresh water.

6. The method of claim 1 wherein said fresh water base is comprised of potable water.

7. The method of claim 1 wherein said fresh water base is comprised of non-potable water.

8. The method of claim 1 wherein said special waste includes materials recovered from construction or demolition activities.

9. The method of claim 8 wherein said special waste has been cleaned.

10. The method of claim 9 wherein said special waste has been reduced or otherwise mechanically altered to reduce constituent size.

11. The method of claim 10 wherein said special waste has an average constituent size of 27 in$^3$ or less.

12. The method of claim 8 wherein said special waste is comprised substantially of wood or other cellulosic materials.

13. The method of claim 12 wherein said wood or other cellulosic materials are treated with a preservative.

14. The method of claim 12 wherein said wood or other cellulosic materials are treated with copper, chromium, or arsenic-bearing compounds.

15. The method of claim 12 wherein said wood or other cellulosic materials have been reduced or otherwise mechanically altered to reduce constituent size.

16. The method of claim 12 wherein said wood or other cellulosic materials are in reduced form and have an average constituent size of 27 in$^3$ or less.

17. A self-setting, self-hardening flowable backfill material that does not contain Portland cement and is suitable for encapsulating special waste material mixed therein, consisting of: water; Class C fly ash; and special waste, with said water and said Class C fly ash present in respective volume ratios in the range of 1:2 to 1:4.

18. The backfill material of claim 17 wherein said special waste is present in respective volume ratio to said water in the range of 2:1 to 4:1.

19. The backfill material of claim 17 wherein said water comprises potable or non-potable water.

20. A self-setting, self-hardening flowable backfill material that does not contain Portland cement and is suitable for encapsulating special waste material mixed therein, consisting of: water; Class C fly ash; special waste, with said water and said Class C fly ash present in respective volume ratios in the range of 1:2 to 1:4; and a brine solution, with said water and said brine solution present in respective volume ratios in the range of 7:1 to 13:1.

21. The backfill material of claim 20, wherein said brine solution contains $MgCl_2$.

22. The backfill material of claim 20, wherein the specific gravity of said brine solution is adjusted to within a range of 18° to 26° Baume by adding metal salts or diluting with fresh water.

23. The backfill material of claim 20 wherein said brine is a naturally occurring ground-source brine solution.

24. The backfill material of claim 23 wherein said naturally occurring ground-source brine solution contains $MgCl_2$.

25. The backfill material method of claim 17, wherein said special waste includes materials recovered from construction and demolition activities that has been cleaned.

26. The backfill material of claim 25, wherein said special waste has been reduced or otherwise mechanically altered to reduce constituent size.

27. The backfill material of claim 26, wherein said special waste has an average constituent size of 27 $in^3$ or less.

28. The backfill material of claim 25 wherein said special waste is comprised substantially of wood or other cellulosic materials.

29. The backfill material of claim 28 wherein said wood or other cellulosic materials are treated with a preservative.

30. The backfill material of claim 28 wherein said wood or other cellulosic materials are treated with copper, chromium, or arsenic-bearing compounds.

31. The backfill material of claim 28 wherein said wood or other cellulosic materials have been reduced or otherwise mechanically altered to reduce constituent size.

32. The backfill material of claim 31 wherein said wood or other cellulosic materials are in reduced form and have an average constituent size of 27 $in^3$ or less.

* * * * *